United States Patent
Brown et al.

(10) Patent No.: US 9,063,611 B2
(45) Date of Patent: *Jun. 23, 2015

(54) SYSTEMS AND METHODS FOR IMPROVING IMAGE TRACKING BASED ON TOUCH EVENTS

(71) Applicant: Google Inc., Mountain View, CA (US)

(72) Inventors: Jeff Brown, Mountain View, CA (US); Mathias Agopian, Mountain View, CA (US)

(73) Assignee: Google Inc., Mountain View, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/912,487

(22) Filed: Jun. 7, 2013

(65) Prior Publication Data

US 2014/0152590 A1 Jun. 5, 2014

Related U.S. Application Data

(63) Continuation of application No. 13/535,353, filed on Jun. 27, 2012, now Pat. No. 8,487,896.

(51) Int. Cl.
*G06F 3/041* (2006.01)

(52) U.S. Cl.
CPC ............ *G06F 3/0418* (2013.01); *G06F 3/0416* (2013.01)

(58) Field of Classification Search
CPC ... G06F 3/0416; G06F 3/044; G06F 3/04883; G06F 2203/04104; G06F 3/03547; G06F 3/041

USPC .................................... 345/173–178; 715/863
See application file for complete search history.

(56) References Cited

U.S. PATENT DOCUMENTS

| | | |
|---|---|---|
| 2010/0289826 A1 | 11/2010 | Park et al. |
| 2011/0080350 A1* | 4/2011 | Almalki et al. ............... 345/173 |
| 2012/0007821 A1* | 1/2012 | Zaliva ........................... 345/173 |
| 2012/0105357 A1* | 5/2012 | Li et al. ......................... 345/174 |

* cited by examiner

*Primary Examiner* — Koosha Sharifi-Tafreshi
(74) *Attorney, Agent, or Firm* — Troutman Sanders LLP; James E. Schutz; Mark Lehi Jones

(57) ABSTRACT

Certain implementations of the disclosed technology may include systems and methods for improving image tracking based on touch events. A method is provided for outputting an image for presentation using an electronic device, the electronic device having a display refresh rate. The method includes detecting one or more touch events received via a touch sensitive surface screen associated with the electronic device, each touch event having a touch event position. The method also includes generating, by the electronic device, a synthetic touch event position based on the one or more touch event positions, the synthetic touch event position calculated to coincide in time with a predicted time, the predicted time being within an offset relative to a display refresh time corresponding to the display refresh rate. The method also includes outputting data based at least in part one or more of the synthetic touch event position or a touch event position associated with the one or more touch events.

22 Claims, 6 Drawing Sheets

SYSTEMS AND METHODS FOR IMPROVING IMAGE TRACKING BASED ON TOUCH EVENTS

RELATED APPLICATIONS

This application is a Continuation of U.S. patent application Ser. No. 13/535,353, filed on Jun. 27, 2012, entitled: "Systems and Methods for Improving Image Tracking Based on Touch Events," the contents of which are hereby incorporated by reference in their entirety.

BACKGROUND

Mobile device screens are increasingly being used as interfaces for touch events. Complex or multi-touch events are often utilized for drawing images, moving objects, scrolling through items, etc. A series of sampled touch events can be utilized to render image movements on the device screen, but there are a number of challenges associated with the processing of touch events to produce smooth, accurate, and seemingly continuous movements.

BRIEF SUMMARY

Some or all of the above needs may be addressed by certain implementations of the disclosed technology. Certain implementations and/or embodiments may include systems and methods for improving image tracking based on touch events. In one implementation, a method is provided for outputting an image for presentation on an electronic device, the electronic device having a display refresh rate. The method includes detecting one or more touch events received via a touch sensitive surface screen associated with the electronic device, each touch event having a touch event position. The method also includes generating, by the electronic device, a synthetic touch event position based on the one or more touch event positions, the synthetic touch event position calculated to coincide in time with a predicted time, the predicted time being within an offset relative to a display refresh time corresponding to the display refresh rate. The method also includes outputting data based at least in part on one or more of the synthetic touch event position or a touch event position associated with the one or more touch events.

According to another example implementation, a system is provided. The system includes a touch screen and a display, the display having a display refresh rate. The system also includes one or more processors in communication with the touch screen and the display. The system includes at least one memory in communication with the one or more processors and configured for storing data and instructions that, when executed by the at least one processor, cause the system to detect one or more touch events from the touch screen, each touch event having a touch event position. The instructions, when executed by the at least one processor, further cause the system to generate a synthetic touch event position based on the one or more touch event positions, the synthetic touch event position calculated to coincide in time with a predicted time, the predicted time being within an offset relative to a display refresh time corresponding to the display refresh rate. The instructions, when executed by the at least one processor, further cause the system to output data based at least in part on one or more of the synthetic touch event position or a touch event position associated with the one or more touch events.

According to another example implementation, a computer-readable medium is provided that stores instructions that, when executed by at least one processor in a system, causes the system to perform a method for outputting an image for presentation using an electronic device, the electronic device having a display refresh rate. The method also includes detecting one or more touch events received via a touch sensitive surface screen associated with the electronic device, each touch event having a touch event position. The method also includes generating, by the electronic device, a synthetic touch event position based on the one or more touch event positions, the synthetic touch event position calculated to coincide in time with a predicted time, the predicted time being within an offset relative to a display refresh time corresponding to the display refresh rate. The method also includes outputting data based at least in part on one or more of the synthetic touch event position or a touch event position associated with the one or more touch events.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
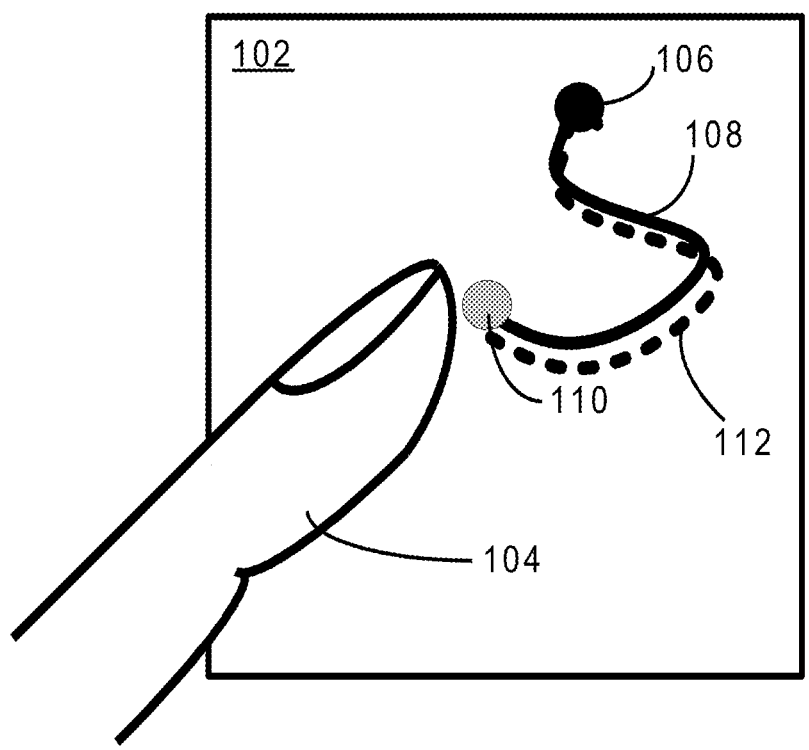
FIG. 1 depicts and illustrative touch screen and example touch events according to an example embodiment of the disclosed technology.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain implementations of the disclosed technology may utilize touch events for rendering and presenting images for display on a screen of a mobile device. In certain example implementations, the touch events may be detected and utilized for drawing images, moving objects, scrolling through items, etc. Example touch events can include simple localized gestures, such as touching and releasing. Other touch events can include complex gestures, such as swiping, pinching, tracing, etc. According to an example implementation, a touch gesture may be sampled to produce a series of touch events for rendering images, image size or shape modifications, and/or image movements on the device screen so that the movements or modifications appear smooth, accurate, and in some cases, continuous.

A typical display screen has a refresh rate of 60 Hz, and therefore, the screen image can be re-rendered approximately every 16.6 milliseconds using available touch event data. According to an example implementation, screen images that are rendered based on touch gestures may benefit from estimating where future touch event positions are going to occur, and basing the rendering on the predicted (or synthetic) event position. For example, when an icon or other graphical object is dragged from one location of a screen to another, the movement of the graphical object may appear to be smooth or jerky, depending on speed at which the touch event data can be handled, the velocity of the touch event, and/or the availability of touch event data for processing before the screen is rendered and refreshed. Example embodiments of the disclosed technology can utilize predicted touch event positions to provide a series of screen renderings that may have enhanced smoothness and accuracy, at least as perceived by the user. Example implementations may also use estimation, interpolation, and/or error correction for rendering the image.

Various hardware and firmware/software architectures may be utilized for improving image tracking based on touch events, according to example embodiments of the disclosed technology, and will now be described with reference to the accompanying figures.

FIG. 1 depicts and illustrative touch screen 102 with touch events associated with a touch gesture 108 according to an example embodiment of the disclosed technology. In a typical scenario a user may use their finger 104 or a stylus to interact with the touch screen 102. According to an example embodiment, touch events may include an initial location of contact 106, sampled positions 112 based on the trace path 108 where the finger 104 or stylus remains in contact with the touch screen 102 while traversing the path 108, and an exit location 110, where the finger 104 or stylus is removed from the touch screen 102. In other example embodiments, multiple fingers may interact with the touch screen to produce certain touch gestures having multiple trace paths 108.

According to an example embodiment, the trace path 108 may be approximated by a series of sampled positions 112. In one example embodiment, the number of sampled positions 112 along the trace path 108 may be based on sample rate, timing, and/or the speed of the gesture. For example, slow gesture movements may result in more sampled position 112 touch data per unit length (i.e., a relatively high linear density of sampled positions 112). Conversely, fast gesture movements may result in relatively low number of samples per unit length. In an example embodiment, the velocity and/or acceleration of the finger 104 or stylus along the trace path 108 may relate to the number of sampled positions 112 generated per unit length, which may, in turn, affect the accuracy and/or smoothness of rendered image movements. Embodiments of the disclosed technology may be utilized to estimate and generate synthetic touch events to address this issue. The use of estimation, interpolation, and/or error correction to generate synthetic touch events will be discussed in detail with respect to FIG. 4 and FIG. 5 below.

Figure 2:
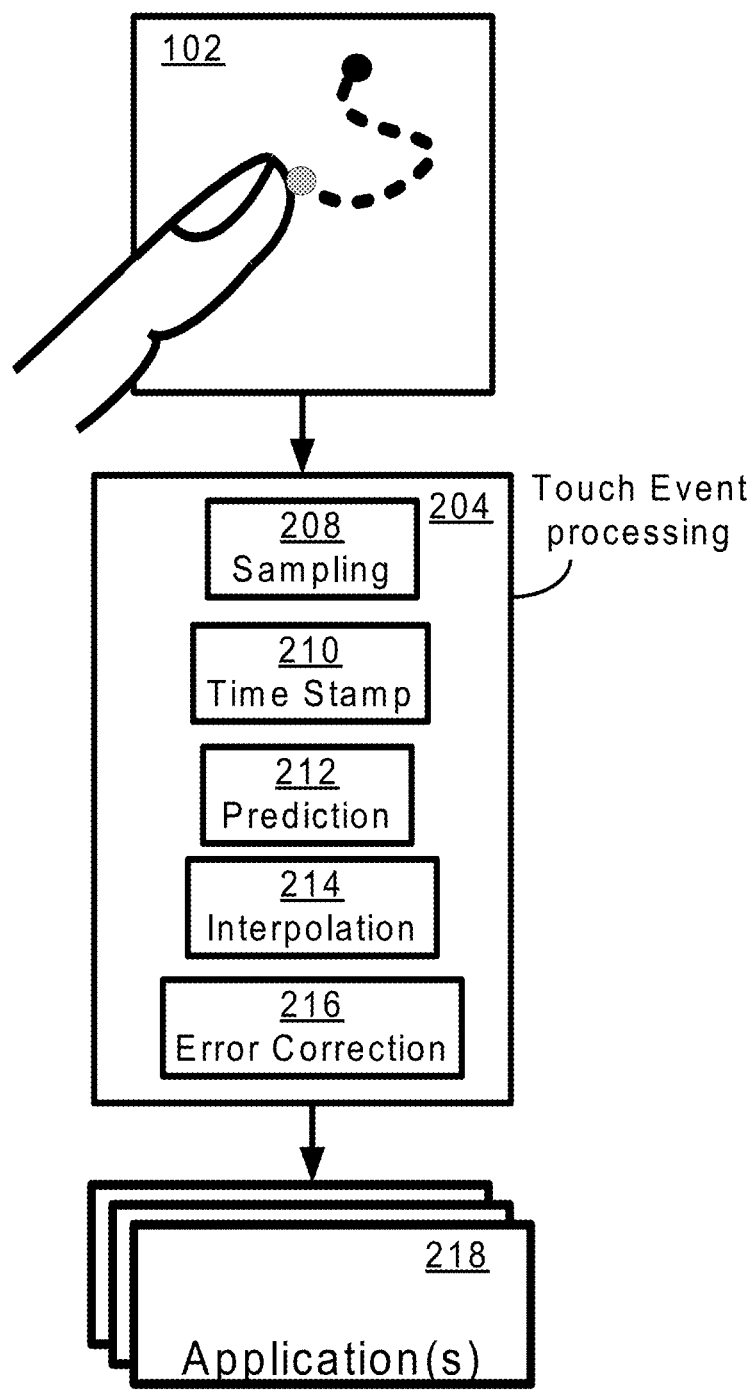
FIG. 2 is block diagram of an illustrative touch event processing system, according to an example embodiment of the disclosed technology.

FIG. 2 is block diagram of an illustrative touch event processing system 204, according to an example embodiment of the disclosed technology. In an example embodiment, the touch event processing system 204 may provide an interface between a touch screen 102 and one or more applications 218. In accordance with an example embodiment, the event processing system 204 may include modules or blocks, for example, which may provide various functions. The modules may include, a but are not limited to a sampling module 208, a time stamping module 210, a position prediction module 212, an interpolation module 214, and an error correction module 216. In accordance with an example implementation, the sampling module 208 may periodically sample the gesture positions as the gestures are input to the device touch screen. In an example implementation, the time stamping module 210 may assign times to at least some of sampled gesture positions. In one embodiment, a touch event may be defined as a sampled- and time-stamped gesture position.

In accordance with example embodiments, the event processing system 204 may also include an event position prediction module 212 for generating synthetic touch event positions. In one embodiment of the disclosed technology, the event processing system 204 may include a sample interpolation module 214. The sample interpolation module 214 may, for example, utilize two or more touch event samples to determine an interpolated event position (or estimate of the touch gesture position) in a region intermediate to or between sample positions. In accordance with example embodiments, the event processing system 204 may also include an error correction module 216 for adjusting current or future synthetic touch events based on other touch events. Details and examples of how the event processing system 204 may utilize these modules will be discussed further with respect to FIG. 4 and FIG. 5 below.

Figure 3:
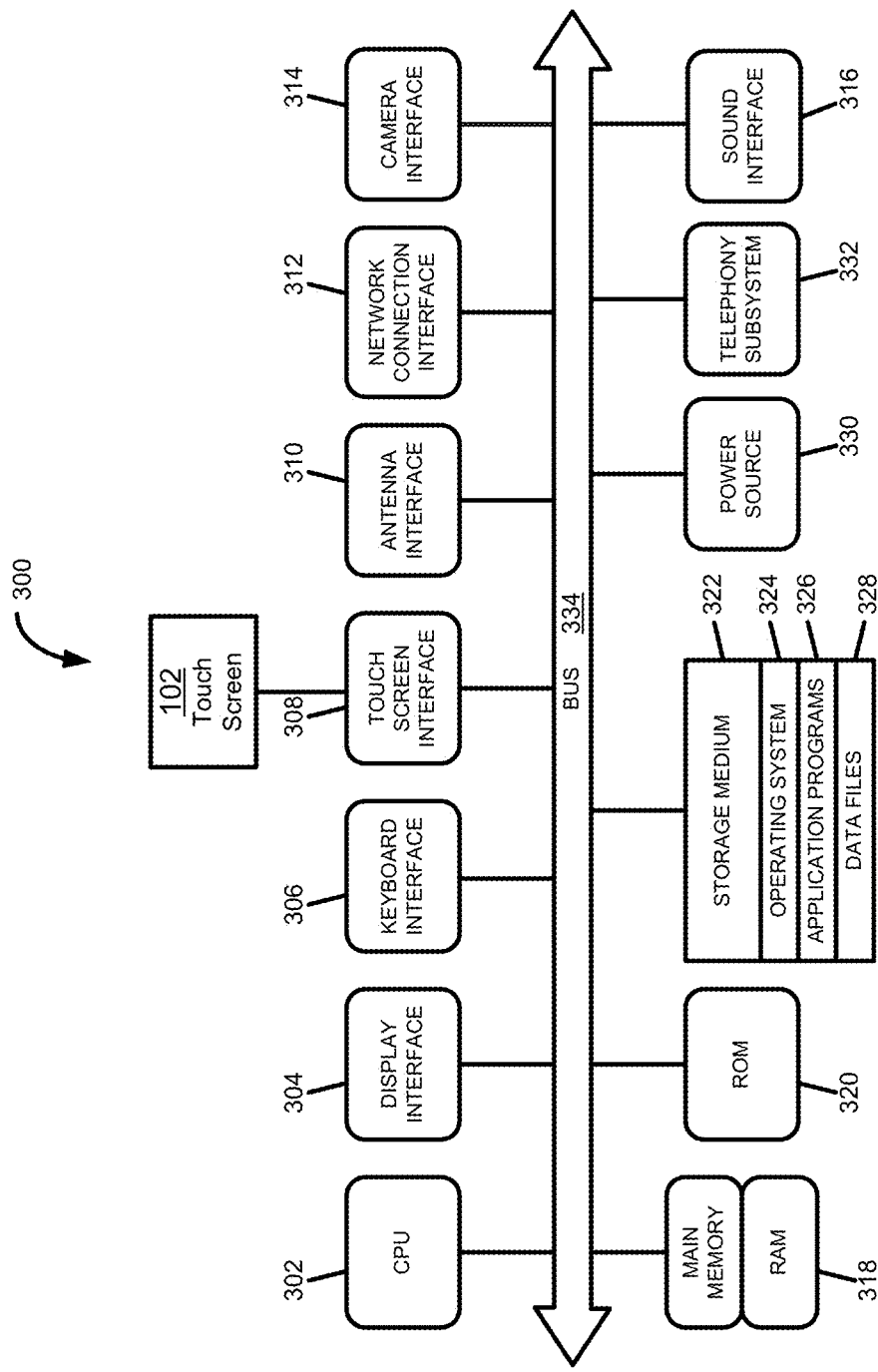
FIG. 3 is a block diagram of an illustrative computing device architecture, according to an example embodiment of the disclosed technology.

Various implementations of the communication systems and methods herein may be embodied in non-transitory computer readable media for execution by a processor. An example implementation may be used in an application of a mobile computing device, such as a smartphone or tablet, but other computing devices may also be used. FIG. 3 illustrates schematic diagram of internal architecture 300 of an example mobile computing device. It will be understood that the architecture illustrated in FIG. 3 is provided for example purposes only and does not limit the scope of the various implementations of the communication systems and methods.

The architecture 300 of FIG. 3 includes a central processing unit (CPU or processor) 302, where computer instructions are processed; a display interface 304 that acts as a communication interface and provides functions for rendering video, graphics, images, and texts on the display; an optional keyboard interface 306 that may provide a communication interface to a keyboard; and a touch screen interface 308 that provides a communication interface to a touch screen 102. Example implementations of the architecture 300 may include an antenna interface 310 that provides a communication interface to an antenna; a network connection interface 312 that provides a communication interface to a network. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data are stored in a volatile memory device for processing by the CPU 302.

According to an example implementation, the architecture 300 includes a read-only memory (ROM) 320 where invariant low-level systems code or data for basic system functions such as basic input and output (I/O), startup, or reception of keystrokes from a keyboard are stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the architecture 300 includes a power source 330 that provides an appropriate alternating current (AC) or direct current (DC) to power components. According to an example implementation, the architecture 300 includes and a telephony subsystem 332 that allows the device 300 to transmit and receive sound over a telephone network. The constituent devices and the CPU 302 communicate with each other over a bus 334.

In accordance with example implementations, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
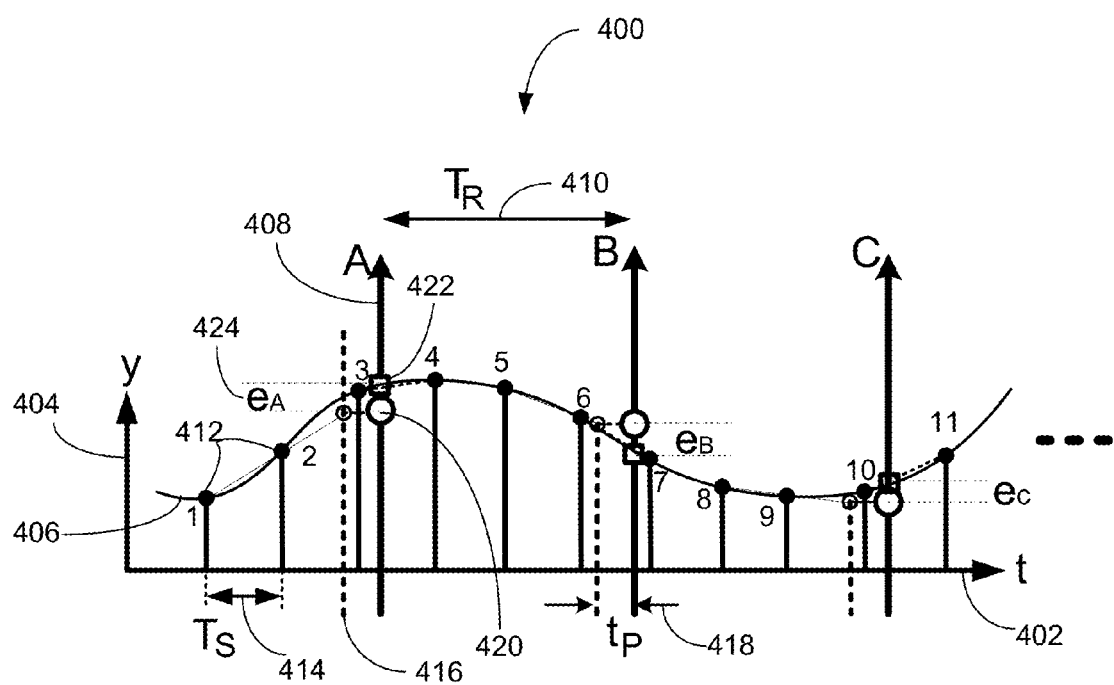
FIG. 4 is an illustrative graph of a touch gesture with example sampled touch positions and generated synthetic touch event positions.

FIG. 4 depicts an example graph 400 of a touch gesture 406 with sampled touch positions 412 (labeled 1 through 11) and generated synthetic touch event positions 420, according to an example implementation of the disclosed technology. This graph 400 is shown with the touch gesture's vertical or y-axis component 404 as a function of time 402. The horizontal or x-axis component is omitted for clarity, but a similar graph could be made to represent the touch gesture's x-axis component. FIG. 4 also shows three screen refresh times 408 (labeled A, B, and C) separated in time by a refresh period $T_R$ 410. The refresh period $T_R$ 410 may be inversely related to the vertical sync frequency or refresh rate. For example, a refresh rate of 60 Hz may have a corresponding refresh period $T_R$ 410 of approximately 16.6 ms. Similarly, a refresh rate of 50 Hz may have a corresponding refresh period $T_R$ 410 of approximately 20 ms.

According to certain implementations of the disclosed technology the touch gesture 406 may be sampled at a sample frequency that is higher than the refresh rate, and therefore, the touch gesture sample period Ts 414, or the time between the sampled touch positions 412 may be shorter than that of the refresh period $T_R$ 410. This arrangement allows touch gestures to be sampled and tracked at a rate faster than the screen refresh rate. However, the refresh period $T_R$ 410 is not necessarily an even multiple of the touch gesture sample period Ts 414, and the two periods may be out of sync with each other. In other words, the time offset between the sampled touch position 412 times and the screen refresh times 408 may vary with each screen refresh time 408. Therefore, a situation exists where the actual position of the touch gesture 406 may be unknown right before the screen is to be refreshed because the last sampled touch event may have happened up to nearly a full touch gesture sample period Ts 414 before the screen refresh time 408. Admittedly, this is the worst-case scenario. In general, the chance for positional error increases as the time gap increases between the last sampled touch position 412 before the screen refresh time 408. The positional error tends to be reduced the closer the last sampled touch position 412 is to the screen refresh time 408. But again, this time gap may vary, so embodiments of the disclosed technology address this situation to reduce the positional error.

As indicated above, the time offset between the sampled touch position 412 times and the screen refresh times 408 may continuously vary, which can create unpredictable, jerky movements in a series of rendered images that are based on a touch gesture 406. To address this issue and according to an example implementation of the disclosed technology, synthetic touch event positions 420 may be determined at a predicted time 416 within an offset time $t_P$ 418 relative to a screen refresh time 408. This example implementation provides a somewhat stabilizing effect that allows the sampled touch position 412 times and the screen refresh times 408 to be out of sync with each other and to run at frequencies that are not multiples of each other. In an example embodiment, even though the time offset between the last sampled touch position 412 times and the screen refresh times 408 varies, the offset time $t_P$ 418 between the determination of the synthetic touch event position and the screen refresh times 408 can be fixed, predetermined, or otherwise controlled. In certain embodiments, the offset time $t_P$ 418 can be set to within about one half of the touch gesture sample period Ts 414. In certain embodiments, the offset time $t_P$ 418 may be set for determining the synthetic touch event position 420 before the screen refresh time 408, as shown in FIG. 4. In other embodiments, the offset time $t_P$ 418 may be set for determining the synthetic touch event position 420 after the screen refresh time 408, for example, to predict a future position of the touch gesture 406 after the screen refresh time 408.

An example of the disclosed technology can be understood by further examination of FIG. 4. For example, consider sampled touch positions 412 (marked 1 and 2) on the left portion of the graph 400. For illustration purposes, these two sampled touch positions 412 may be utilized to estimate the synthetic touch event position 420 at a predicted time 416, where the predicted time 416 is set at an offset time $t_P$ 418 relative to the screen refresh time 408. In an example embodiment, the estimated synthetic touch event position 420, determined at the predicted time 416, may be used for representing the touch gesture 406 when the screen is refreshed at the screen refresh time 408 (marked A). In a similar fashion, and according to an example embodiment, sampled touch positions 412 (marked 4, 5, and 6) may be utilized to estimate the synthetic touch event position 420 at a predicted time 416 having an offset time $t_P$ 418 before screen refresh time 408 (marked B), and so forth.

Notice that a sampled touch position 412 (marked 3) arrived after the predicted time 416 and before the screen refresh time 408 (marked A), and may therefore, be a more accurate representation of the touch gesture 406 at the screen refresh time 408. In one embodiment, such sampled touch positions 412 (for example, the one marked 3) may be utilized for representing the position of the touch gesture 406, rather than utilizing the determined synthetic touch event position 420. However, if the sampled touch position 412 arrives too close to the screen refresh time 408, then there may not be sufficient time to process the sampled touch position in time for refresh, and in that case, the determined synthetic touch event position 420 may be used to represent the touch gesture 406 at the screen refresh time 408. Similarly, if the sampled touch position 412 arrives too late, for example, after performing the display processing for the screen screen refresh time 408, then it can't be used for that particular screen refresh time 408, but it may be utilized in computing a synthetic touch event position 420 for the subsequent refresh time 408.

FIG. 4 also shows interpolated touch gesture positions 422 represented by small open squares and positioned in time to coincide with the screen refresh times 408. According to an example embodiment, the interpolated touch gesture positions 422 may be determined to estimate the position of the touch gesture 406 at the actual screen refresh time 408. Therefore, in one embodiment, one or more sampled touch positions 412 before the screen refresh time 408, and one or more sampled touch positions 412 after the screen refresh time 408 may be utilized to determine the interpolated touch gesture positions 422. In one embodiment, the interpolation may be a simple linear interpolation. In other embodiments, the interpolation may utilize curve fitting and/or regression. According to certain example embodiments, the interpolated touch gesture positions 422 may be utilized to estimate a position error 424 between the determined synthetic touch event position 420 and the position of the touch gesture 406 at the actual screen refresh time 408. According to certain example embodiments, the position error 424 may be utilized in subsequent predictions of synthetic touch event positions 420 to improve the accuracy of such predictions.

Figure 5:
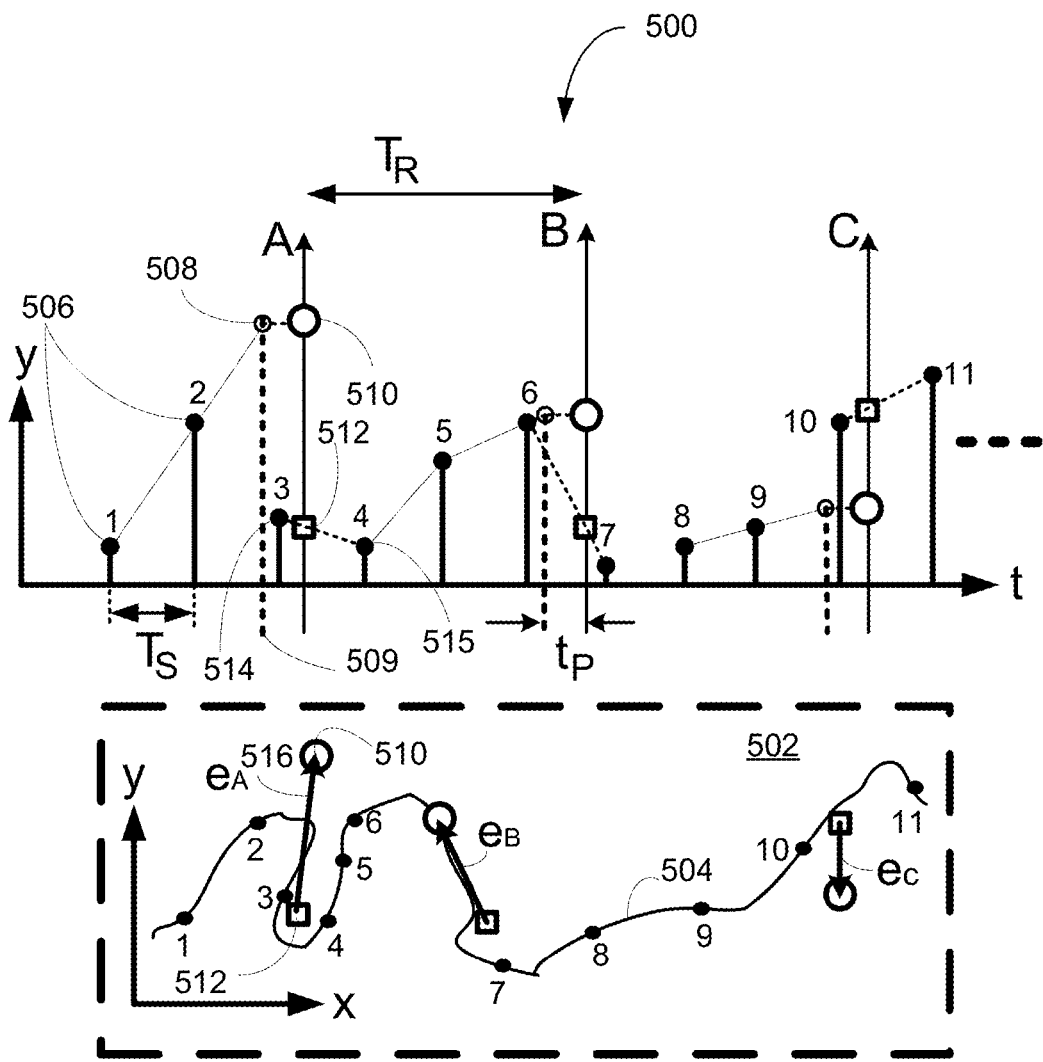
FIG. 5 is another illustrative graph of a touch gesture with example sampled touch positions and generated synthetic touch event positions.

FIG. 5 depicts another example graph 500 representing sampled y-axis touch positions 506 of a touch gesture 504. A portion of an example touch screen 502 is also depicted in FIG. 5 with a corresponding sampled touch gesture 504 in the x-y plane. As in FIG. 4, the sampled touch positions 506 are shown in the top portion of the graph in the y-t plane (labeled 1 through 11), but in FIG. 5, corresponding samples (labeled 1 through 11) are also shown in the bottom portion of the figure in the x-y plane for illustration purposes. Also, the example touch gesture 504 shape perturbations shown in FIG. 5 are extremely exaggerated to more clearly illustrate some of the details of the disclosed technology.

In an example embodiment, position error vectors 516 (marked $e_A$, $e_B$, and $e_C$) may be calculated as a difference vector between determined synthetic touch event positions 510 and interpolated positions 512. For example, and in a similar manner as described above, an estimated touch event position 508 may be predicted at a predetermined sample time 509 and based on previously sampled touch event positions 506 (such as those marked 1 and 2). This estimated touch event position 508 may be used as the synthetic touch event position 510 for purposes of rendering the image at the refresh time. In this example illustration, another sampled touch event position (marked 3) arrived after the synthetic touch event position 510 was calculated, and sampled touch event positions 506 on either side of the screen refresh time (for example, those sampled touch event positions marked 3 and 4) may be used for calculating the interpolated touch event position 512. In this illustration, there is a sizeable difference between the synthetic touch event position 510 and the interpolated touch event position 512, and this difference is represented by the position error vector 516 marked $e_A$.

Examination of the related samples shown in the example portion of the touch screen 502 of FIG. 5 corresponding to the touch gesture 504 in the x-y plane can help explain the magnitude an direction of the position error vectors 516. For example, sampled touch event positions 506 marked 1 and 2 may be used for determining the estimated touch event position 508, which may in turn be used to generate the synthetic touch event position 510. But the sampled touch event positions 506 marked 3 is far off the estimated path of the actual touch gesture 504 due to, perhaps, a rapid deviation in the touch gesture 504 between sampled touch event positions 506 marked 2 and 3. In an example embodiment, the interpolated event position 512 may not perfectly coincide with the actual touch gesture 504, but they may be a reasonable estimate of the position of the actual touch gesture 504 at refresh time.

In an example embodiment, the position error vectors 516 may be utilized to calculate subsequent estimated touch event positions 508 and/or synthetic touch event positions 510. In certain example embodiments, the magnitude of the position error vectors 516 may be monitored to alter algorithms for determining subsequent synthetic touch event positions 510. For example, and according to one embodiment, if the magnitude of the position error vectors 516 exceeds a predetermined threshold, predictions of the synthetic touch event positions 510 may be based on more localized sampled touch event positions 506. In accordance with an example embodiment, the offset time $t_P$ (as in offset time $t_P$ 418 of FIG. 4) and/or predetermined sample time 509 position may be adjusted dynamically (before or after the screen refresh time) depending on the magnitude of the position error vectors 516. For example, if it is detected that position error vectors 516 are accumulating, or growing, or greater than a threshold, then the algorithm may subtract a portion of the position error vectors 516 vector to compensate. In certain example embodiments, actual sampled touch event positions 506 may be compared with the predictions, and a portion of the error between actual and predicted positions may be subtracted to alleviate growing errors or so that the errors can be minimized. Conversely, if magnitude of the position error vectors 516 are less than a minimum threshold, then the algorithm can become more aggressive and be dynamically adjusted to predict the synthetic touch event positions 510 further into the future, for example, at a predetermined sample time 509 after the refresh time, and/or the offset time $t_P$ may be expanded to greater than ½ of the touch sample period Ts.

According to certain example embodiments, velocity and/or acceleration of the touch gesture 504 may be estimated from position and timing information, and the predetermined sample time 509, position and/or the offset time $t_P$ may be dynamically adjusted based on the estimated velocity and/or acceleration. For example, a distance Δx may be calculated between a trace path position at time $t_1$ and another trace path position at time $t_2$ to determine the approximate or average local velocity, $v_i=\Delta x/\Delta t$, where $\Delta t=t_2-t_1$ and i may represent the approximate local position along the trace path. In an example embodiment, the approximate acceleration may be determined from changes in the average local velocity, for example the local acceleration may be represented as $a_i=(\Delta v_i)/\Delta t=(v_i-v_{i-1})/\Delta t$.

Figure 6:
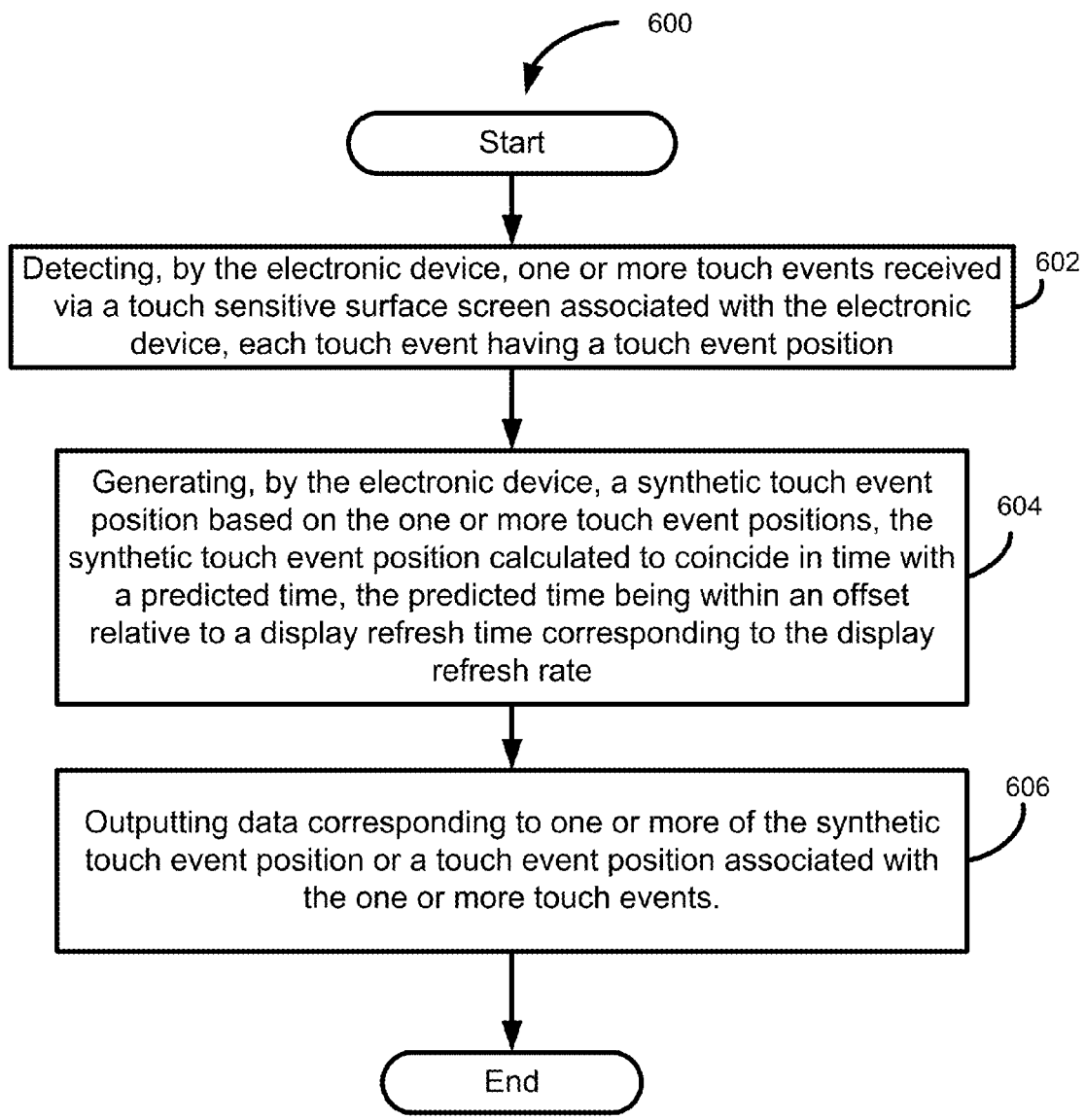
FIG. 6 is a flow diagram of a method according to an example embodiment of the disclosed technology.

An example method 600 for outputting an image for presentation using an electronic device, the electronic device having a display refresh rate, will now be described with reference to the flowchart of FIG. 6. The method 600 starts in block 602, and according to an example implementation includes detecting, by the electronic device, one or more touch events received via a touch sensitive surface screen associated with the electronic device, each touch event having a touch event position. In block 604, the method 600 includes generating, by the electronic device, a synthetic touch event position based on the one or more touch event positions, the synthetic touch event position calculated to coincide in time with a predicted time, the predicted time being within an offset relative to a display refresh time corresponding to the display refresh rate. In block 606, the method 600 includes outputting data based at least in part one or more of the synthetic touch event position or a touch event position associated with the one or more touch events. The method 600 ends after block 606.

Example embodiments may be utilized for generating an image for presentation based at least in part on the synthetic touch event.

Example embodiments of the disclosed technology may include generating an interpolated event position based at least in part on a touch event before and a touch event after the display refresh time. Example embodiments may further include generating an image or screen rendering based at least in part on the interpolated event. According to example embodiments, the disclosed technology can include determining an error between the synthetic touch event position and the interpolated event position, and further generating the image based at least in part on the error. According to certain example embodiments offset time $t_P$ may be set to determine the synthetic event at a time before the refresh time. According to another example embodiment, the offset tp may be set to determine the synthetic event at a time after the refresh In accordance with certain implementations, generating the synthetic touch event position can include estimating a velocity vector based on the one or more touch events. According to one implementation, the electronic device may include a touch screen, and each of the one or more touch events may include a notification that the touch screen was touched. According to an example embodiment, touch events detected within the offset time $t_P$ may be utilized for generating a subsequent synthetic touch event position.

According to example implementations, certain technical effects can be provided, such as creating certain systems and methods that provide improved tracking of touch gestures. Example implementations of the disclosed technology can provide the further technical effects of providing systems and methods for generating a series of rendered images for presentation on a mobile device display in a way that makes movements based on touch gestures appear more smooth to a user.

In example implementations of the disclosed technology, the touch event processing system 204 and/or the system architecture 300 may include any number of hardware and/or software applications that are executed to facilitate any of the operations. In example implementations, one or more I/O interfaces may facilitate communication between the touch event processing system 204 and/or the system architecture 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the touch event processing system 204 and/or the system architecture 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the touch event processing system 204 and/or the system architecture 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, implementations of the disclosed technology may include the touch event processing system 204 and/or the system architecture 300 with more or less of the components illustrated in FIG. 2 or FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for outputting an image for presentation using an electronic device, the electronic device having a display refresh rate, the method comprising:
    detecting, by the electronic device, one or more touch events received via a touch sensitive surface screen associated with the electronic device, each touch event having a touch event position;
    generating, by the electronic device, a synthetic touch event position based on the one or more touch event positions, the synthetic touch event position calculated to coincide in time with a predicted time, the predicted time being within an offset relative to a display refresh time corresponding to the display refresh rate, wherein touch events detected within the offset are utilized for generating a subsequent synthetic touch event position; and
    outputting data based at least in part one or more of the synthetic touch event position or a touch event position associated with the one or more touch events.

2. The method of claim 1, further comprising:
    generating an interpolated event position based at least in part on a touch event before and a touch event after the display refresh time, and outputting the data further based at least in part on the interpolated event.

3. The method of claim 2, further comprising:
    determining an error between the synthetic touch event position and the interpolated event position, and outputting the data further based at least in part on the error.

4. The method of claim 3, further comprising progressively compensating the error over time and outputting the data further based at least in part on the compensation.

5. The method of claim 1, wherein the offset is before or after the refresh time.

6. The method of claim 1, wherein generating the synthetic touch event position comprises one or more of estimating a velocity vector based on the one or more touch events or predicting a future velocity vector using an estimated acceleration vector based on the one or more touch events.

7. The method of claim 1, wherein the electronic device comprises a touch screen, and wherein each of the one or more touch events comprise a notification that the touch screen was touched.

8. A system comprising:
    a touch screen;
    a display, the display having a display refresh rate;
    one or more processors in communication with the touch screen and the display; and
    at least one memory in communication with the one or more processors and configured for storing data and instructions that, when executed by the at least one processor, cause the system to:
        detect one or more touch events from the touch screen, each touch event having a touch event position;
        generate a synthetic touch event position based on the one or more touch event positions, the synthetic touch event position calculated to coincide in time with a predicted time, the predicted time being within an offset relative to a display refresh time corresponding to the display refresh rate, wherein touch events detected within the offset are utilized for generating a subsequent synthetic touch event position; and
        output data based at least in part one or more of the synthetic touch event position or a touch event position associated with the one or more touch events.

9. The system of claim 8, wherein the instructions, when executed by the at least one processor, further cause the system to:
    generate an interpolated event position based at least in part on a touch event before and a touch event after the display refresh time; and
    output the data further based at least in part on the interpolated event.

10. The system of claim 8, wherein the instructions, when executed by the at least one processor, further cause the system to:
    determine an error between the synthetic touch event position and the interpolated event position; and
    output the data further based at least in part on the error.

11. The system of claim 8, wherein the offset is before the refresh time.

12. The system of claim 8, wherein the offset is after the refresh time.

13. The system of claim 8, wherein the instructions, when executed by the at least one processor, further cause the system to:
    estimate a velocity vector based on the one or more touch events
    predicting a future velocity vector using an estimated acceleration vector based on the one or more touch events; and
    generate a synthetic touch event position based at least in part on one or more of the velocity vector or the estimated acceleration vector.

14. The system of claim 8, wherein each of the one or more touch events include a notification that the touch screen was touched.

15. The system of claim 14, wherein the notification includes a time stamp.

16. A non-transitory computer-readable medium that stores instructions that, when executed by at least one processor in a system, cause the system to perform a method for outputting an image for presentation using an electronic device, the electronic device having a display refresh rate, the method comprising:
    detecting, by the electronic device, one or more touch events received via a touch sensitive surface screen associated with the electronic device, each touch event having a touch event position;
    generating, by the electronic device, a synthetic touch event position based on the one or more touch event positions, the synthetic touch event position calculated to coincide in time with a predicted time, the predicted time being within an offset relative to a display refresh time corresponding to the display refresh rate, wherein touch events detected within the offset are utilized for generating a subsequent synthetic touch event position; and
    outputting data based at least in part on one or more of the synthetic touch event position or a touch event position associated with the one or more touch events.

17. The non-transitory computer-readable medium of claim 16 that further stores instructions that further causes the system to perform the method steps of:
    generating an interpolated event position based at least in part on a touch event before and a touch event after the display refresh time; and
    output the data further based at least in part on the interpolated event.

18. The non-transitory computer-readable medium of claim 17 that further stores instructions that further causes the system to perform the method steps of:
    determining an error between the synthetic touch event position and the interpolated event position; and
    output the data further based at least in part on the error.

19. The non-transitory computer-readable medium of claim 16, wherein the offset is before the refresh time.

20. The non-transitory computer-readable medium of claim 16, wherein the offset is after the refresh time.

21. The non-transitory computer-readable medium of claim 16, wherein generating the synthetic touch event position comprises estimating a velocity vector based on the one or more touch events.

22. The non-transitory computer-readable medium of claim 16, wherein the electronic device is a mobile device that comprises a touch screen, and wherein each of the one or more touch events comprise a notification that the touch screen was touched.

* * * * *